US012407138B2

(12) United States Patent
Miller et al.

(10) Patent No.: US 12,407,138 B2
(45) Date of Patent: Sep. 2, 2025

(54) CONTACT AND SHIELD CONFIGURATION FOR GROUND CURRENT OPTIMIZATION

(71) Applicant: TE Connectivity Solutions GmbH, Schaffhausen (CH)

(72) Inventors: Keith Edwin Miller, Manheim, PA (US); Scott Eric Walton, Mount Joy, PA (US); Charles Raymond Gingrich, III, Mechanicsburg, PA (US); Rodney T. Smith, Hummelstown, PA (US)

(73) Assignee: TE Connectivity Solutions GmbH (CH)

( * ) Notice: Subject to any disclaimer, the term of this patent is extended or adjusted under 35 U.S.C. 154(b) by 357 days.

(21) Appl. No.: 18/050,523

(22) Filed: Oct. 28, 2022

(65) Prior Publication Data

US 2024/0146003 A1 May 2, 2024

(51) Int. Cl.
*H01R 13/6596* (2011.01)
*H01R 13/6467* (2011.01)

(52) U.S. Cl.
CPC ..... *H01R 13/6596* (2013.01); *H01R 13/6467* (2013.01)

(58) Field of Classification Search
CPC .............. H01R 13/646; H01R 13/6461; H01R 13/6467; H01R 13/6469; H01R 13/6471; H01R 13/658; H01R 13/6581; H01R 13/6591; H01R 13/6596
USPC ..................................................... 439/607.28
See application file for complete search history.

(56) References Cited

U.S. PATENT DOCUMENTS

| | | | |
|---|---|---|---|
| 10,003,144 | B1 | 6/2018 | Sharf |
| 10,424,860 | B2 | 9/2019 | Okuyama et al. |
| 10,993,314 | B2 | 4/2021 | Charbonneau et al. |
| 10,998,678 | B1 | 5/2021 | Miller et al. |
| 11,025,014 | B1 | 6/2021 | Miller et al. |
| 11,031,734 | B1 | 6/2021 | Miller et al. |

OTHER PUBLICATIONS

European Search Report, EP App. No. 23206086 International Filing Date Oct. 26, 2023.

*Primary Examiner* — Thanh Tam T Le

(57) ABSTRACT

An electrical connector and a ground system which includes ground contacts and ground shields positioned proximate the ground contacts. The ground contacts have receiving sections, securing sections and mounting sections. The receiving sections have first engagement portions and second engagement portions. The ground shields have a nonplanar configuration, with portions of the ground shields passing between signal contacts. Surfaces of the securing sections of the ground contacts are positioned in mechanical and electrical engagement with surfaces of the ground shields, providing first ground contact areas across which ground currents may flow. The first engagement portions of the ground contacts are provided in electrical and mechanical engagement with the surfaces of the ground shields, providing second ground contact areas across which the ground currents may flow. The second ground contact areas are spaced from the first ground contact areas to allow the ground currents to properly flow through the entire ground shields.

16 Claims, 4 Drawing Sheets

CONTACT AND SHIELD CONFIGURATION FOR GROUND CURRENT OPTIMIZATION

FIELD OF THE INVENTION

The present invention relates to a contact and shield configuration for ground current optimization to provide adequate shielding from crosstalk between signal lines in a connector.

BACKGROUND OF THE INVENTION

Due to the increasing complexity of electronic components, it is desirable to fit more components in less space on a circuit board or other substrate. Consequently, the spacing between electrical terminals within connectors has been reduced, while the number of electrical terminals housed in the connectors has increased, thereby increasing the need in the electrical arts for electrical connectors that are capable of handling higher and higher speeds and to do so with greater and greater pin densities. It is desirable for such connectors to have not only reasonably constant impedance levels, but also acceptable levels of impedance and crosstalk, as well as other acceptable electrical and mechanical characteristics. Therefore, there remains a need to provide appropriate shielding to preserve signal integrity and to minimize crosstalk as speeds of signals increase and the footprint of the connector maintains or increases density of signal pairs.

It would, therefore, be beneficial to provide a connector with ground contacts and ground shield which provides for adequate ground currents for proper shielding from crosstalk between signal lines in a connector. It would also be beneficial to provide a system with a robust, manufacturable connection without requiring additional components or complicated features in the shield component.

SUMMARY OF THE INVENTION

An embodiment is directed to a ground system for use in an electrical connector. The ground system includes ground contacts and ground shields. The ground contacts have receiving sections, securing sections and mounting sections. The receiving sections have first engagement portions and second engagement portions. The ground shields are positioned proximate the ground contacts. The ground shields have a nonplanar configuration, with portions of the ground shields passing between signal contacts. Surfaces of the securing sections of the ground contacts are positioned in mechanical and electrical engagement with surfaces of the ground shields, providing first ground contact areas across which ground currents may flow. The first engagement portions of the ground contacts are provided in electrical and mechanical engagement with the surfaces of the ground shields, providing second ground contact areas across which the ground currents may flow. The second ground contact areas are spaced from the first ground contact areas to allow the ground currents to properly flow through the entire ground shields.

An embodiment is directed to an electrical connector which controls cross talk and signal radiation. The electrical connector includes a housing having a mating end and a mounting end. Signal contacts are positioned in the housing. The signal contacts extend between the mating end and the mounting end and are arranged in pairs to carry differential signals. Ground contacts are positioned in the housing and extend between the mating end and the mounting end. Respective ground contacts of the ground contacts are positioned adjacent to respective signal contacts of the signal contacts. The ground contacts have receiving sections and securing sections, with the receiving sections having first engagement portions and second engagement portions. Ground shields are positioned proximate the ground contacts. Portions of the ground shields pass between the signal contacts. Surfaces of the securing sections of the ground contacts are positioned in mechanical and electrical engagement with surfaces of the ground shields, providing first ground contact areas across which ground currents may flow. The first engagement portions of the ground contacts are provided in electrical and mechanical engagement with the surfaces of the ground shields, providing second ground contact areas across which the ground currents may flow. The second ground contact areas are spaced from the first ground contact areas to allow the ground currents to properly flow through the entire ground shields. The ground contacts and the ground shields entirely peripherally surround pairs of signal contacts to provide electrical shielding for the pairs of signal contacts.

An embodiment is directed to an electrical connector which controls cross talk and signal radiation. The electrical connector has a housing having a mating end and a mounting end. Signal contacts are positioned in the housing and are arranged in pairs to carry differential signals. Ground contacts are positioned in the housing and extend between the mating end and the mounting end. Respective ground contacts of the ground contacts are positioned adjacent to respective signal contacts of the signal contacts. The ground contacts have first engagement portions and second engagement portions. Ground shields are positioned proximate the ground contacts. Portions of the ground shields pass between the signal contacts. First ground contact areas where surfaces of the ground contacts are positioned in mechanical and electrical engagement with surfaces of the ground shields provide first paths across which ground currents may flow. The first ground contact areas are provided proximate the mounting end of the housing. Second ground contact areas where the first engagement portions of the ground contacts are provided in electrical and mechanical engagement with the surfaces of the ground shields provide second paths across which the ground currents may flow. The second ground contact areas are provided proximate the mating end of the housing.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
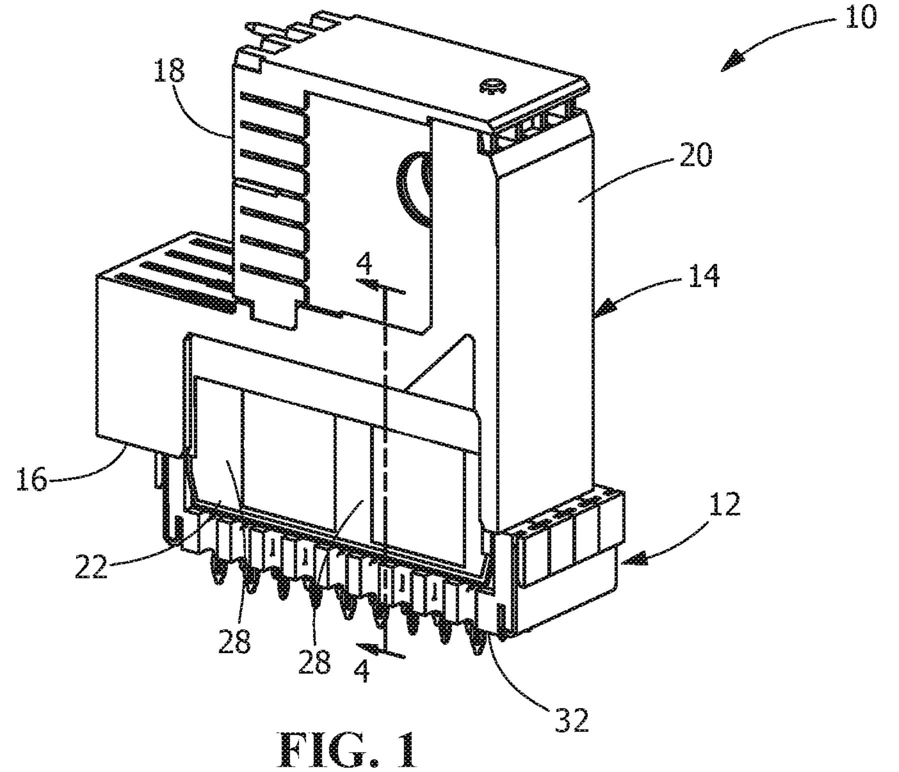
FIG. 1 is a front perspective view of an illustrative connector system shown in an assembled position, with a backplane connector mated to a mating daughtercard connector.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

FIG. 1 illustrates an illustrative electrical connector system 10 having a backplane connector 12 and a daughtercard connector 14 that are used to electrically connect a backplane circuit board (not shown) and a daughtercard circuit board (not shown). While the electrical connector system 10 is described herein with reference to backplane connectors 12 and daughtercard connectors 14, it is realized that the subject matter herein may be utilized with different types of electrical connectors other than a backplane connector or a daughtercard connector. The backplane connector 12, and the daughtercard connector 14 are merely illustrative of an electrical connector system 10.

In the illustrative embodiment shown, the daughtercard connector 14 constitutes a right angle connector wherein a mating interface 16 and mounting interface 18 of the daughtercard connector 14 are oriented perpendicular to one another. The daughtercard connector 14 is mounted to the daughtercard circuit board at the mounting interface 18. Other orientations of the interfaces 16, 18 are possible in alternative embodiments.

The daughtercard connector 14 includes a housing 20, made of one or more components, holding a plurality of circuit board wafers 22 therein. The circuit board wafers 22 have pairs of individual signal pathways or traces (not shown) that extend between the mating interface 16 and the mounting interface 18. The signal traces have signal conductive pads 24 (FIG. 4) provided proximate the mating interface 16. The circuit board wafers 22 have individual ground pathways or traces (not shown) that extend between the mating interface 16 and the mounting interface 18. The ground traces have ground conductive pads 26 (FIG. 4) provided proximate the mating interface 16. The circuit board wafers 22 also have ground pathways or traces 28 (FIG. 1) on opposites sides of the circuit board wafers 22 from the ground traces. The ground traces 28 extend between the mating interface 16 and the mounting interface 18. In alternative embodiments, the circuit board wafers 22 may be contact modules, the signal traces may be mating signal contacts and the ground traces may be ground contacts.

In the illustrated embodiment, the backplane connector 12 constitutes a header connector mounted to the backplane circuit board. However, other types of connectors may be used. When the backplane connector 12 is mated to the daughtercard connector 14, the daughtercard circuit board is oriented generally perpendicular with respect to the backplane circuit board.

Figure 2:
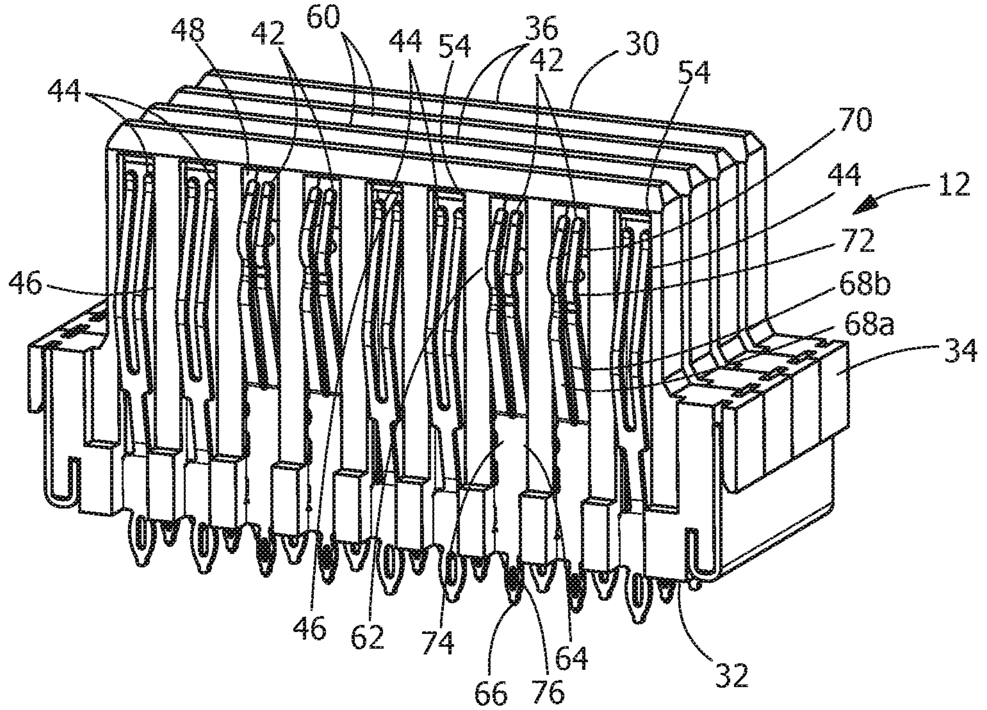
FIG. 2 is an enlarged front perspective view of the backplane connector of FIG. 1.

As is shown in FIG. 2, the backplane connector 12 includes a mating end 30 and a mounting end 32 that are oriented generally parallel to one another. The backplane connector 12 is mounted to the backplane circuit board at the mounting end 32. Other orientations of the mating end 30 and the mounting end 32 are possible in alternative embodiments.

The backplane connector 12 includes a housing 34 which includes a plurality of individual housings or modules 36. Each of the modules 36 extends from the mating end 30 to the mounting end 32. Each of the modules 36 holds a plurality of individual signal contacts 42 that extend between the mating end 30 and the mounting end 32. In the exemplary embodiment, the signal contacts 42 are arranged in pairs carrying differential signals. However, in other configurations, the signal contacts 42 may not be arranged in pairs for carrying other signals. Each of the modules 36 holds a plurality of ground contacts 44 that extend between the mating end 30 and the mounting end 32. In the illustrative embodiment shown, the ground contacts 44 are electrically connected to ground shields or plates 46 that extend between the mating end 30 and the mounting end 32.

Figure 3:
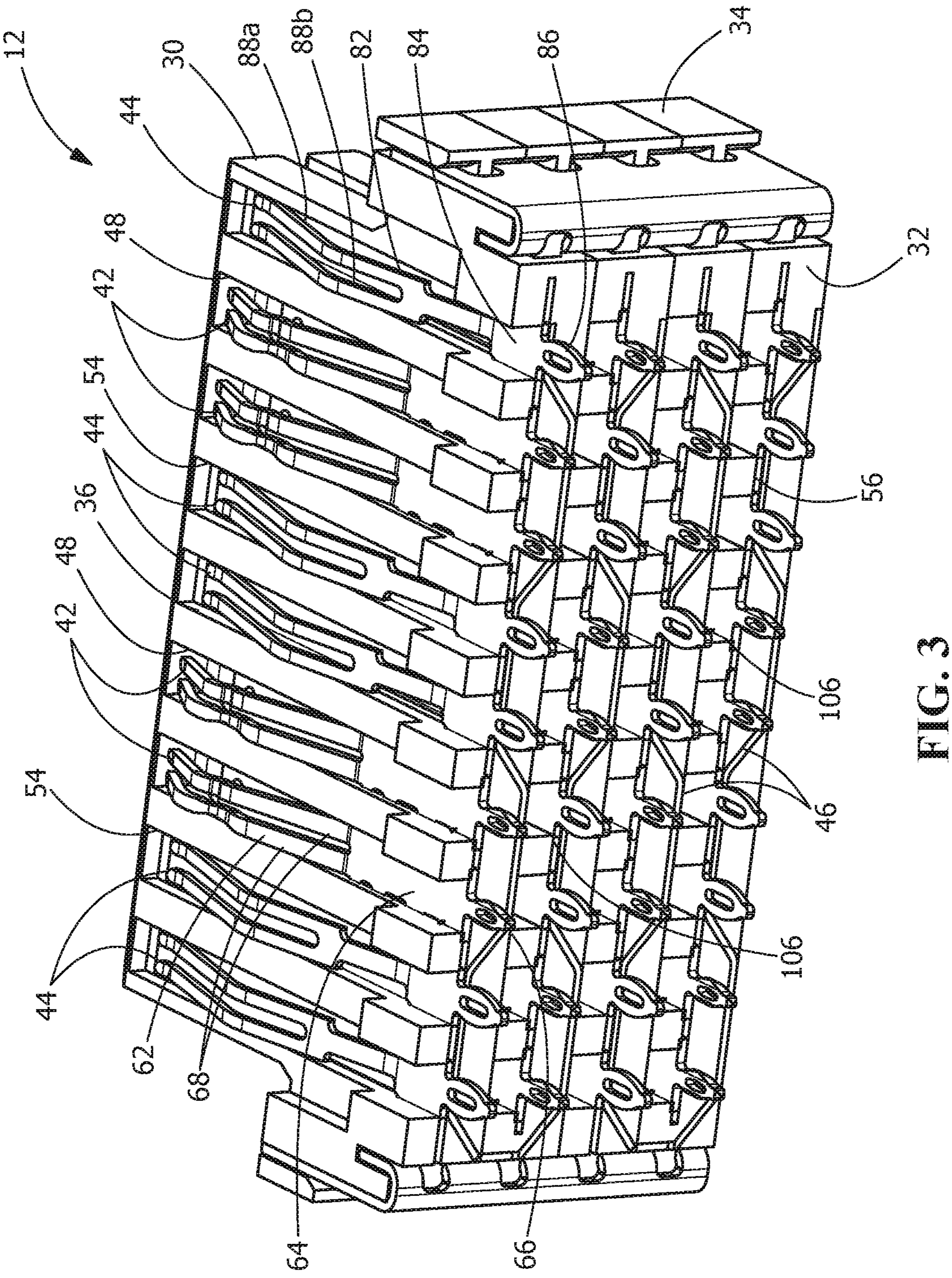
FIG. 3 is an enlarged bottom perspective view of the backplane connector of FIG. 1.
Figure 4:
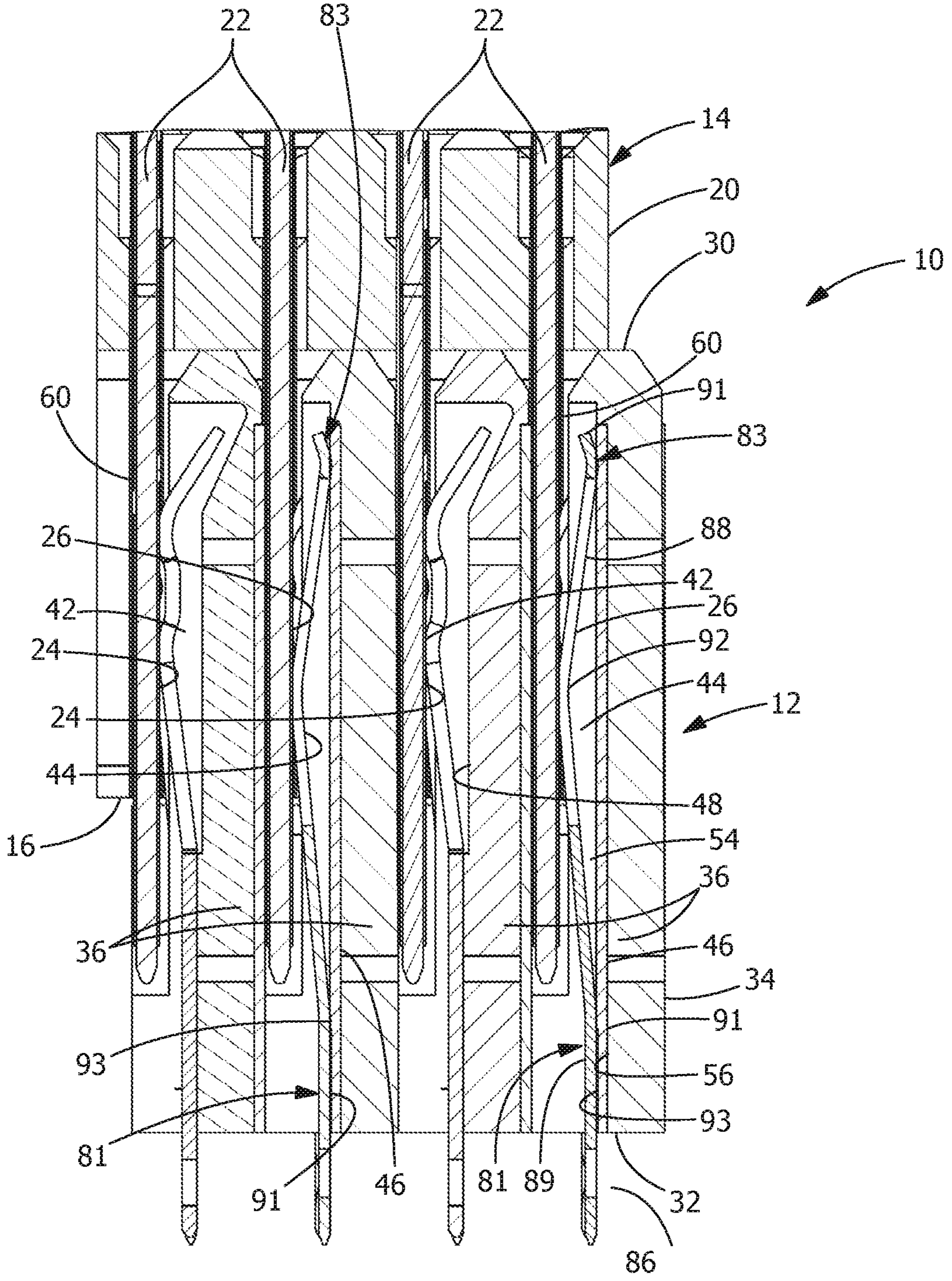
FIG. 4 is a cross-sectional view of the daughtercard connector mated with the backplane connector, taken along line 4-4 of FIG. 1.

As shown in FIGS. 2 through 4, each of the modules 36 includes a plurality of signal cavities or channels 48 which extends between the mating end 30 and the mounting end 32. Each of the modules 36 includes a plurality of ground cavities or channels 54 which extend between the mating end 30 and the mounting end 32 and ground slots 56 which extend between the mating end 30 and the mounting end 32.

Any number of ground channels 54 may be provided. The ground channels 54 may be provided at any locations within the modules 36. In an exemplary embodiment, the ground channels 54 are generally positioned between pairs of signal channels 48. The ground slots 56 are sized and shaped to receive the ground shields or plates 46.

In the illustrative embodiment shown, the connector 12 has four modules 36 which are positioned adjacent to each other. However, other number of modules may be provided, such as, but not limited to, 8 modules or 16 modules. Circuit board receiving slots 60 are provided between adjacent modules 36. Each circuit board receiving slot 60 extends from the mating end 30 of the connector 12 toward the mounting end 32. In other illustrative embodiments, the housing 34 of connector 12 may be a one piece housing, eliminating the need for individual modules.

As shown in FIGS. 2 and 3, each signal contact 42 has a receiving section 62, a securing section 64 and circuit board mounting section 66. In the illustrative embodiment shown, the receiving section 62 includes two resilient arms 68 with lead in portions 70 and engagement portions 72. In the embodiment shown, first resilient arms 68*a* have a different configuration than the second resilient arms 68b. The resilient arms 62 are configured to press against the signal conductive pads 24 of the signal traces of the daughter card connector 14 when the daughter card connector 14 is mated to the backplane connector 12. The securing section 64 has retention members 74, which may be, but are not limited to barbs or projections, which extend from side surfaces of the securing section 64. The circuit board mounting section 66 has a compliant portion 76, such as an eye of the needle pin, although other configurations may be used. The configuration of the signal contact 42 is meant to be illustrative as other embodiments of the signal contact may be used. For example, the signal contacts 42 may have asymmetrical or other configurations which allows for optimal performance under different conditions.

Figure 5:
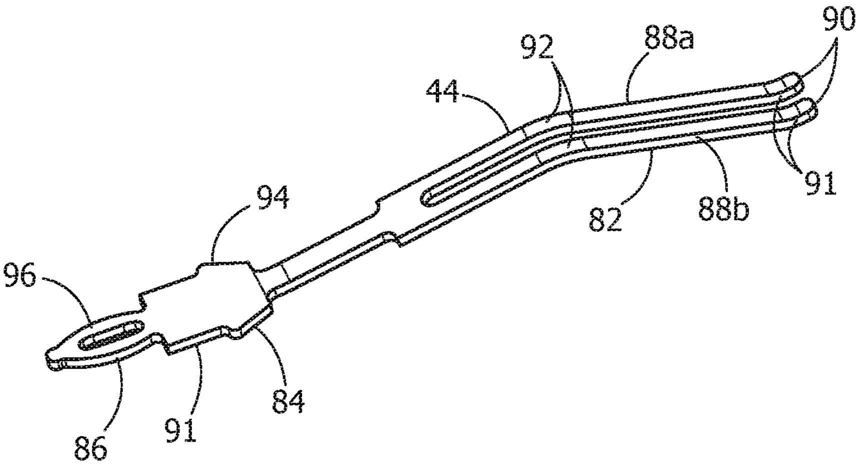
FIG. 5 is a perspective view of an illustrative ground contact of the present invention.
Figure 6:
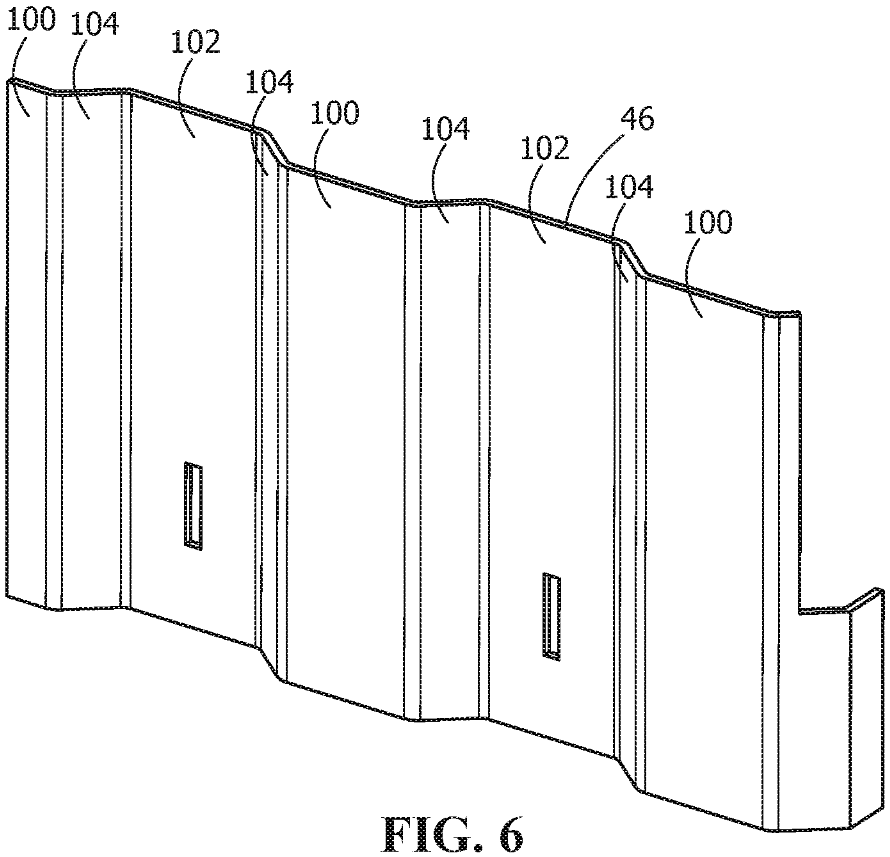
FIG. 6 is a perspective view of a ground shield of the present invention.

As shown in FIGS. 3 through 5, each ground contact 44 has a receiving section 82, a securing section 84 and circuit board mounting section 86. In the illustrative embodiment shown, the receiving section 82 includes two contact beams or resilient arms 88 with first engagement portions 91 on lead in portions 90 and second engagement portions 92. In the embodiment shown, first resilient arms 88a has the same configuration as the second resilient arms 88b. However, the resilient arms 88 can be made with contact beam geometries that are slightly different from each other so that the ground contacts 44 can fully function with components made within a larger tolerance range than designs that use identical contact beam geometries. The ground contacts 44 may have asymmetrical or other configurations which allows for optimal performance under different conditions.

The resilient arms 82 are configured to cause the second engagement portions 92 to press against the ground conductive pads 26 of the ground traces of the daughter card connector 14 and the first engagement portions 91 to press against the ground shields or plates 46 when the daughter card connector 14 is mated to the backplane connector 12. The securing section 84 has retention members 94, which may be, but are not limited to barbs or projections, which extend from side surfaces of the securing section 84. The circuit board mounting section 86 has a compliant portion 96, such as an eye of the needle pin, although other configurations may be used.

The ground shields or plates 46 have a non-planar, wavy configuration to pass between and along pairs of signal contacts 42. The ground shields 46 may be shaped to be positioned generally equidistant from adjacent signal contacts 42.

In various embodiments, the ground shields 46 may be located as far from the signal contacts 42 as possible. For example, the ground shields 46 may be shaped to be positioned generally equidistant from adjacent signal contacts 42.

The ground shields 46 have first sections 100 and second sections 102 which are positioned in a different plane than the first sections 100. Transition sections 104 extend between the first sections 100 and the second sections 102. In the illustrative embodiment, the transition sections 104 are angled with respect to the first sections 100 and the second sections 102. Alternatively, the transition sections 104 may be curved or radiused rather than angled.

FIG. 3 is a bottom perspective view of the backplane connector 12 with the ground shields 46 shown to illustrate the layout of the signal contacts 42, the ground contacts 44 and ground shields 46. The ground contacts 44 and the ground shields 46 entirely peripherally surround the pairs of signal contacts 42 to provide electrical shielding for the pairs of signal contacts 42. Gaps or spaces, which could allow EMI leakage between pairs of signal contacts 42, are minimized through or between the ground contacts 44 and the ground shields 46.

The ground shields 46 extend along multiple pairs of signal contacts 42. The ground shields 46 engage the ground contacts 44 to electrically common the ground contacts 44 and the ground shields 46 together. The ground contacts 44 and the ground shields 46 form cavities 106 (FIG. 3) around the pairs of signal contacts 42. The cavities 106 may have any shape depending on the shapes of the ground contacts 44 and the ground shields 46. In the illustrated embodiments, the cavities 106 have a hexagonal prism shape.

When assembled, the ground contacts 44 are positioned in the ground cavities or channels 54 and the ground shields 46 are positioned in the ground slots 56, as shown in FIG. 4. In this position, the retention members 94 of the securing sections 84 of the ground contacts 44 cooperate with the walls of the channels 54 of the housing 34 to secure and retain the ground contacts 44 in the channels 54. The ground shields 46 are also retained and secured in position in the ground slots 56.

As shown in FIG. 4, when properly inserted, surfaces 95 of the securing sections 84 of the ground contacts 44 are placed in mechanical and electrical engagement with surfaces 93 of the ground shields 46. This provides first ground contact areas 81 across which ground currents may flow. The surfaces 95 may be placed in engagement with the surfaces 93 by welding, pressure or some other means.

In addition to the electrical connection between the ground contacts 44 and the ground shields 46 at the first ground contact area 81, the ground contacts 44 and the ground shields 46 are also placed in mechanical and electrical engagement at a second ground contact areas 83. At the second ground contact areas 83, the first engagement portions 91 of the ground contacts 44 are provided in electrical and mechanical engagement with the surfaces 93 of the ground shields 46. The second ground contact areas 83 are provided proximate the mating end 30 of the housing 34 of the backplane connector 12 which is spaced from the first ground contact area 81 positioned proximate the mounting end 32. The positioning of the first ground contact areas 81 and the second ground contact areas 83 at opposite ends of the ground shields 46 allows the ground current to properly flow through the entire ground shields, without creating gaps in the effectiveness of the ground shields 46.

As first ends of the resilient arms 88 of the receiving sections 82 are fixed by the securing sections 84 and as the opposed second ends of the resilient arms 88 engage the ground shields, the resilient arms 88 function as a double supported leaf spring. This ensures that proper electrical and mechanical connections are provided and maintained at the first ground contact areas 81 and the second ground contact areas 83.

Upon mating of the daughtercard connector 14 to the backplane connector 12, the circuit board wafers 22 of the daughter card connector 14 are positioned in the circuit board receiving slots 60. In this position, the signal contacts 42 physically and electrically engage the signal conductive pads 24 of the signal traces of the circuit board wafers 22. In addition, the ground contacts 44 are also placed in physical and electrical engagement with the ground conductive pads 26 of the ground traces of the circuit board wafers 22. As this occurs, the second engagement portions 92 of the ground contacts 44 are resiliently deformed inward toward a respective ground shield 46, causing the resilient arms 88 to deform. This resilient deformation of the resilient arms 88 causes the first engagement portions 91 of the ground contacts 44 to apply additional force to the surfaces 93 of the ground shields 46, thereby ensuring that the first engagement portions 91 of the ground contacts 44 are retained in electrical and mechanical engagement with the surfaces 93 of the ground shields 46.

With the connector 12 properly assembled, the ground contacts 44 and the ground shields 46 extend about the periphery of the pairs of signal contacts 42 and surround the pairs of signal contacts 42 to provide electrical shielding for the pairs of signal contacts 42. In an exemplary embodiment, entire, 360 degree shielding is provided by the ground contacts 44 and the ground shields 46 along the length of the signal contacts 42. The ground contacts 44 and the ground shields 46 surround portions of the mating signal traces when the connectors 12, 14 are mated. The ground contacts 44 and the ground shields 46 provide shielding along the entire mating interface with the signal conductive pads 24 of the mating signal traces. The ground contacts 44 and the ground shields 46 may control electrical characteristics at the mating interface 16 and throughout the connector 12, such as by controlling cross talk, signal radiation, impedance or other electrical characteristics.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A ground system for use in an electrical connector, the ground system comprising:

ground contacts having receiving sections, securing sections and mounting sections, the receiving sections having first engagement portions and second engagement portions, each of the receiving sections has one or more contact beams with the first engagement portions and the second engagement portions provided thereon, first ends of the one or more contact beams are fixed by the securing sections and opposed second ends of the one or more contact beams engage ground shields causing the contact beams to function as a double supported leaf spring;

the ground shields positioned proximate the ground contacts, the ground shields having a nonplanar configuration;

surfaces of the securing sections of the ground contacts positioned in mechanical and electrical engagement with surfaces of the ground shields, providing first ground contact areas across which ground currents may flow;

the first engagement portions of the ground contacts provided in electrical and mechanical engagement with the surfaces of the ground shields, providing second ground contact areas across which the ground currents may flow, the second ground contact areas spaced from the first ground contact areas to allow the ground currents to properly flow through the entire ground shields.

2. The ground system as recited in claim 1, wherein the one or more contact beams are two contact beams which have the same configuration.

3. The ground system as recited in claim 1, wherein the one or more contact beams are two contact beams have different configurations.

4. The ground system as recited in claim 1, wherein the securing sections have retention members and the mounting sections have compliant portions.

5. The ground system as recited in claim 1, wherein the ground shields have first sections and second sections which are positioned in a different plane than the first sections, transition sections extend between the first sections and the second sections.

6. The ground system as recited in claim 1, wherein the ground contacts and the ground shields entirely peripherally surround pairs of signal contacts to provide electrical shielding for the pairs of signal contacts.

7. The ground system as recited in claim 1, wherein first ground contact areas and the second ground contact areas engage the ground shields at opposite ends of the ground shields.

8. A ground system for use in an electrical connector, the ground system comprising:

ground contacts having receiving sections, securing sections and mounting sections, the receiving sections having first engagement portions and second engagement portions;

ground shields positioned proximate the ground contacts, the ground shields having a nonplanar configuration, portions of the ground shields pass between signal contacts, the ground shields have first sections and second sections which are positioned in a different plane than the first sections, transition sections extend between the first sections and the second sections, the transition sections are angled with respect to the first sections and the second sections;

surfaces of the securing sections of the ground contacts positioned in mechanical and electrical engagement with surfaces of the ground shields, providing first ground contact areas across which ground currents may flow;

the first engagement portions of the ground contacts provided in electrical and mechanical engagement with the surfaces of the ground shields, providing second ground contact areas across which the ground currents may flow, the second ground contact areas spaced from the first ground contact areas to allow the ground currents to properly flow through the entire ground shields.

9. An electrical connector which controls cross talk and signal radiation, the electrical connector comprising:

a housing having a mating end and a mounting end;

signal contacts positioned in the housing, the signal contacts extending between the mating end and the mounting end, the signal contacts being arranged in pairs to carry differential signals;

ground contacts positioned in the housing, the ground contacts extending between the mating end and the mounting end, respective ground contacts of the ground contacts being positioned adjacent to respective signal contacts of the signal contacts, the ground contacts having receiving sections and securing sections, the receiving sections having first engagement portions and second engagement portions, wherein each of the receiving sections has one or more contact beams with the first engagement portions and the second engagement portions provided thereon, first ends of the one or more contact beams are fixed by the securing sections and opposed second ends of the one or more contact beams engage ground shields, causing the one or more contact beams to function as a double supported leaf spring;

the ground shields positioned proximate the ground contacts, portions of the ground shields pass between the signal contacts;

surfaces of the securing sections of the ground contacts positioned in mechanical and electrical engagement with surfaces of the ground shields, providing first ground contact areas across which ground currents may flow;

the first engagement portions of the ground contacts provided in electrical and mechanical engagement with the surfaces of the ground shields, providing second ground contact areas across which the ground currents may flow, the second ground contact areas spaced from the first ground contact areas to allow the ground currents to properly flow through the entire ground shields;

wherein the ground contacts and the ground shields entirely peripherally surround pairs of signal contacts to provide electrical shielding for the pairs of signal contacts.

10. The electrical connector as recited in claim 9, wherein the first ground contact areas and the second ground contact areas engage the ground shields at opposite ends of the ground shields.

11. The electrical connector as recited in claim 9, wherein the one or more contact beams are two contact beams which have the same configuration.

12. The electrical connector as recited in claim 9, wherein the one or more contact beams are two contact beams have different configurations.

13. The electrical connector as recited in claim 9, wherein the securing sections have retention members to retain the ground contacts in the housing.

14. The electrical connector as recited in claim 9, wherein the ground shields have first sections and second sections which are positioned in a different plane than the first sections, transition sections extend between the first sections and the second sections.

15. The electrical connector as recited in claim 14, wherein the transition sections are angled with respect to the first sections and the second sections.

16. An electrical connector which controls cross talk and signal radiation, the electrical connector comprising:

a housing having a mating end and a mounting end;

signal contacts positioned in the housing, the signal contacts being arranged in pairs to carry differential signals;

ground contacts positioned in the housing, the ground contacts extending between the mating end and the mounting end, respective ground contacts of the ground contacts being positioned adjacent to respective signal contacts of the signal contacts, the ground contacts having receiving sections and securing sections, the receiving sections having one or more contact beams with first engagement portions provide at free ends and second engagement portions;

ground shields positioned proximate the ground contacts, portions of the ground shields pass between the signal contacts;

first ground contact areas where surfaces of the securing sections of the ground contacts are positioned in mechanical and electrical engagement with surfaces of the ground shields provide first paths across which ground currents may flow, the first ground contact areas provided proximate the mounting end of the housing;

second ground contact areas where the first engagement portions of the one or more contact beams of the receiving sections of the ground contacts are provided in electrical and mechanical engagement with the surfaces of the ground shields provide second paths across which the ground currents may flow, the second ground contact areas provided proximate the mating end of the housing;

wherein the second ground contact areas are spaced from the first ground contact areas to allow the ground currents to properly flow through the entire ground contacts and the entire ground shields.

* * * * *